United States Patent
Mince

(10) Patent No.: US 9,848,733 B2
(45) Date of Patent: Dec. 26, 2017

(54) CHARCOAL STARTER WITH A CONSUMABLE FIRE IGNITION SYSTEM AND METHOD OF USE

(71) Applicant: EZ Flame BBQ, Inc., Menlo Park, CA (US)

(72) Inventor: William Loyd Mince, Menlo Park, CA (US)

(73) Assignee: EZ Flame BBQ, Inc., Menlo Park, CA (US)

( * ) Notice: Subject to any disclaimer, the term of this patent is extended or adjusted under 35 U.S.C. 154(b) by 0 days.

(21) Appl. No.: 15/603,757

(22) Filed: May 24, 2017

(65) Prior Publication Data

US 2017/0251876 A1    Sep. 7, 2017

Related U.S. Application Data

(63) Continuation of application No. 14/826,108, filed on Aug. 13, 2015.

(51) Int. Cl.
   *A47J 37/07* (2006.01)
(52) U.S. Cl.
   CPC .................................. *A47J 37/079* (2013.01)

(58) Field of Classification Search
   CPC ..... A47J 37/079; A47J 37/0768; F23Q 13/04; Y02B 40/163; C10L 11/02
   See application file for complete search history.

(56) References Cited

U.S. PATENT DOCUMENTS

2015/0047626 A1* 2/2015 Mince .................. A47J 37/079
                                                        126/25 B

* cited by examiner

*Primary Examiner* — Alfred Basichas
(74) *Attorney, Agent, or Firm* — Temmerman Law Office; Mathew J. Temmerman

(57) ABSTRACT

A method for igniting a fuel source utilizing a fuel ignition system, the method comprising the steps of providing a housing having an outer lateral surface, an inner lateral surface, a top opening and a bottom opening, and a plurality of vent holes and a plurality of stops on a bottom portion of the housing; positioning a flammable support over the plurality of stops through the top opening of the housing; adding the fuel source on the flammable support through the top opening; igniting the flammable support utilizing an igniting means; facilitating a rapid and uniform ignition of the fuel source utilizing the heat generated during the ignition of the flammable support inside the housing; and wherein the flammable support is the only flammable component of the system.

21 Claims, 11 Drawing Sheets

CHARCOAL STARTER WITH A CONSUMABLE FIRE IGNITION SYSTEM AND METHOD OF USE

RELATED APPLICATIONS

The present application is a continuation of pending U.S. nonprovisional application Ser. No. 14/826,108, filed Aug. 13, 2015, the entire contents of which is hereby incorporated by reference.

BACKGROUND OF THE DISCLOSURE

Technical Field of the Disclosure

The present embodiment relates generally to charcoal starters, and more particularly, to an improved charcoal starter that ensures safe transfer of hot charcoals to a barbecue unit and eliminates the need for repetitive insertions of a flammable material into the charcoal starter.

Description of the Related Art

Barbecues commonly use charcoal as a fuel source. Igniting charcoal requires a high temperature for a duration of time, and to facilitate this process a growing number of charcoal starter devices has been developed. In conventional charcoal starters, charcoal is placed on top of the charcoal starter and a flammable material such as newspaper is placed at the bottom portion of the starter where the charcoals are present. As the newspaper burns it remains in close proximity to the charcoal and ignites the charcoal. Besides charcoal, any fuel source like briquettes, wood chips, and cut wood can also be utilized as they are common in the field of barbecuing. If the applied flammable material does not ignite the charcoal, then repetitive insertions of the flammable material are often required until the charcoal catches fire. This method of ignition raises the temperature of the charcoal starter beyond a safe temperature such that it may cause burn injury to a user. Further, the flammable material may contain harmful or fatal substances, which may be transferred to the charcoal and then onto food items while cooking.

Various methods, products and improvements exist in order to alleviate the aforementioned problems. One such method describes an apparatus for igniting charcoal with the help of an inflammable and sustainable material, especially a material based on wood. The apparatus includes a cage that receives the charcoal. Once the charcoal has burnt sufficiently, the hot coals are transferred to a barbecue unit by pouring them out of the apparatus. As the apparatus has no thermally resistant handles, the user must normally exercise extreme care while transferring the charcoal to the barbecue unit to avoid the splashing out of the hot coals.

Another method describes a combustible and readily ignitable rectangular container. The container is designed to insert into a freestanding octagonal vented metal ignition sleeve resting on a grill surface. Crumpled paper is placed within the bottom of an ignition sleeve of the container. The container includes a removable handle. The crumpled paper is ignited, which in turn ignites the combustible container and the charcoal briquettes in an efficient manner. A user connects the handle with the container to transfer the hot charcoals to a barbecue unit. Even so, the crumpled paper may include toxic substances, which may be transferred onto food items while cooking. Since the handle is not permanently attached to the container, there is a greater chance of the user touching the hot container directly with his/her hands and potentially sustaining a burn to himself/herself.

Yet another method describes an improved charcoal starter that employs a unique charcoal release system that permits the charcoal to be deposited into a barbecue unit through the bottom of the device, thereby eliminating the splashing of lighted ashes. The charcoal starter utilizes a combustible material such as newspaper for firing the device. However, this combustible material often cannot produce a high enough temperature required for the proper ignition of the charcoal. Moreover, repetitive insertions of the combustible material are often required in order to adequately ignite the charcoal.

FIG. 1 illustrates an example prior art of a charcoal starter. The charcoal starter 100 is an open metal cylinder comprising a thermally resistant handle 110. A wire frame 120 is secured to the metal cylinder to provide a support for the charcoal. A plurality of vent holes 130 is located near the bottom of the device 100 to provide air flow for the ignition process. FIG. 2 illustrates the existing type of charcoal starter 100 depicting the charcoal 140 at the top of the device 100 with a flammable material 150 stuffed underneath the bottom of the device 100. FIG. 3 illustrates the existing type of charcoal starter 100 showing how the charcoal 160 is poured out of the device 100 when the charcoals 160 are preferably fully ignited.

There is thus a need for a charcoal starter that is reliable and easy to use. Such a needed device would utilize a non-toxic flammable material and would eliminate the need for repetitive insertions of the flammable material in order to adequately ignite the charcoal. Such a device would utilize a flammable material that would stay ignited long enough to ensure the efficient ignition of the charcoal. Moreover, the needed device would ensure a safe transfer of hot charcoals from the charcoal starter to a barbecue unit. In addition, this needed charcoal starter would be economical, portable, as well as user friendly. The present embodiment accomplishes these objectives.

SUMMARY OF THE DISCLOSURE

To minimize the limitations found in the prior art, and to minimize other limitations that will be apparent upon the reading of the specification, the preferred embodiment of the present invention provides a fuel ignition system and related method for igniting a fuel source through an ignition process with the help of a flammable support.

The fuel ignition system comprises a housing, a thermally resistant handle and a flammable support. The housing includes an outer lateral surface, an inner lateral surface, a top portion, a middle portion, a bottom portion, a top opening and a bottom opening. The bottom portion includes a plurality of first vent holes and the middle portion includes a plurality of second vent holes. The inner lateral surface includes a plurality of stops associated with the plurality of first vent holes in the bottom portion of the housing. In the preferred embodiment, the plurality of second vent holes without any stops are arranged in three sets of rows such that each second vent hole in each row overlaps the others by a minimum of ¼ inch. Each of the plurality of stops is attached to each of the plurality of first vent holes and is projected towards the inner lateral surface of the housing. In the preferred embodiment, each of the plurality of stops is created during the process of manufacture through the punching process of each of the plurality of first vent holes at the bottom portion of the housing. The thermally resistant handle is attached to the outer lateral surface. The fuel source and the flammable support are inserted into the housing through the top opening.

The flammable support is ignited utilizing any suitable igniting means. The ignition of the flammable support generates heat, which facilitates a rapid and uniform ignition of the fuel source inside the housing. The plurality of first and second vent holes provides adequate air-flow required for the ignition process inside the housing. The flammable support is made from a readily combustible material.

In use, a portion of the fuel source is placed inside the housing high enough to reach at least one row of the second vent holes. Thereafter, the flammable support is placed on top of the fuel source inside the housing. Next, a remaining portion of the fuel source is placed on top of the flammable support which is then ignited utilizing an igniting means through at least one of the plurality of second vent holes. The ignited flammable support in turn ignites the charcoals and gets thoroughly consumed during the ignition process. In this way, the fuel source is ignited in the top half of the housing. Additional fuel is stored below the flammable support and is then ignited after the fuel reaches the grill, thus extending the cooking time.

When the flammable support is ignited and burned away, the hot charcoal is removed from the housing by simply lifting up the housing via the thermally resistant handle. The flammable support is thoroughly consumed during this process and the hot charcoal, by the force of gravity, simply falls out through the bottom opening of the housing and is left behind in a barbecue unit. Thereafter, the user safely lifts the housing away via the thermally resistant handle. As the hot charcoal moves from the housing to the barbecue unit, the charcoals are contained within the housing walls until the housing is removed, thereby increasing the safety of the hot charcoal transfer process.

In an alternate configuration of the present invention, each of the plurality of stops is split into two smaller tabs. Preferably, the flammable support includes a plurality of protrusions. The splitting of the plurality of stops into tabs allows each protrusion of the flammable support to be firmly positioned between the tabs. Each protrusion serves as a wick for the ignition of the flammable support and is accessed through the plurality of vent holes.

In yet another configuration of the present invention, the flammable support includes a plurality of indents at a bottom ring thereof. The plurality of indents allows the protrusion to pass by the bottom ring thereby enabling the placement of several flammable supports one above the other during packaging.

In an additional configuration, the flammable support is manufactured in a conical shape with a top ring hole in the top of the cone.

A first objective of the present invention is to provide a simple and reliable fuel ignition system.

A second objective of the present invention is to provide a system and method that utilizes a non-toxic flammable material.

A third objective of the present invention is to provide a system and method that eliminates the need for repetitive insertions of the flammable material in order to adequately ignite a fuel source.

A fourth objective of the present invention is to provide a system and method that utilizes a flammable material that stays ignited long enough to ensure the efficient ignition of the charcoal.

A fifth objective of the present invention is to provide a system and method that ensures a safe transfer of hot charcoals from the housing to a barbecue unit.

A sixth objective of the present invention is to provide a system and method that is economical, portable, as well as user friendly.

A seventh objective of the present invention is to provide a system to ignite a fuel source in a top half of the housing while storing additional fuel source below the flammable support which ignites after the fuel reaches the grill, thus extending the cooking time.

These and other advantages and features of the present invention are described with specificity to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

The housing includes an outer lateral surface, an inner lateral surface, a top portion, a middle portion, a bottom portion, a top opening and a bottom opening.

Figure 1:
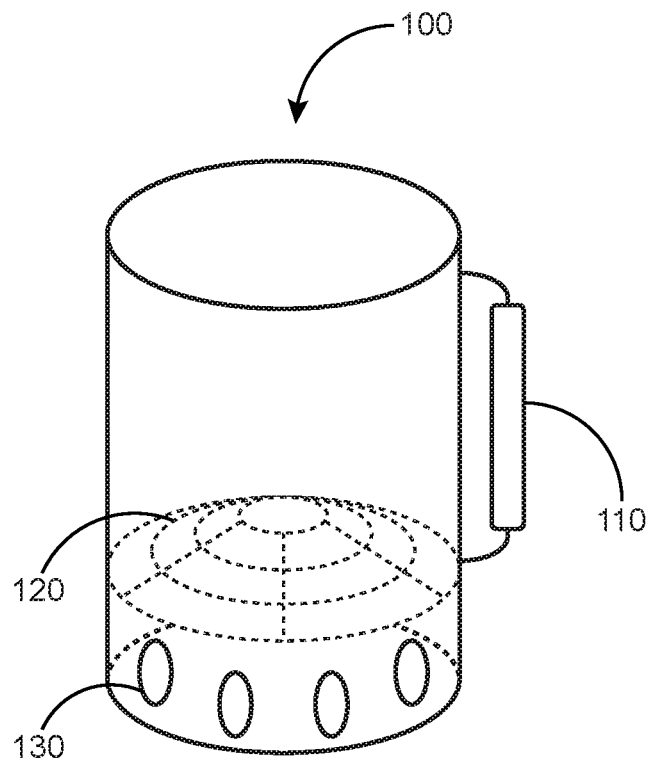
FIG. 1 illustrates a perspective view of an existing type of charcoal starter.
Figure 2:
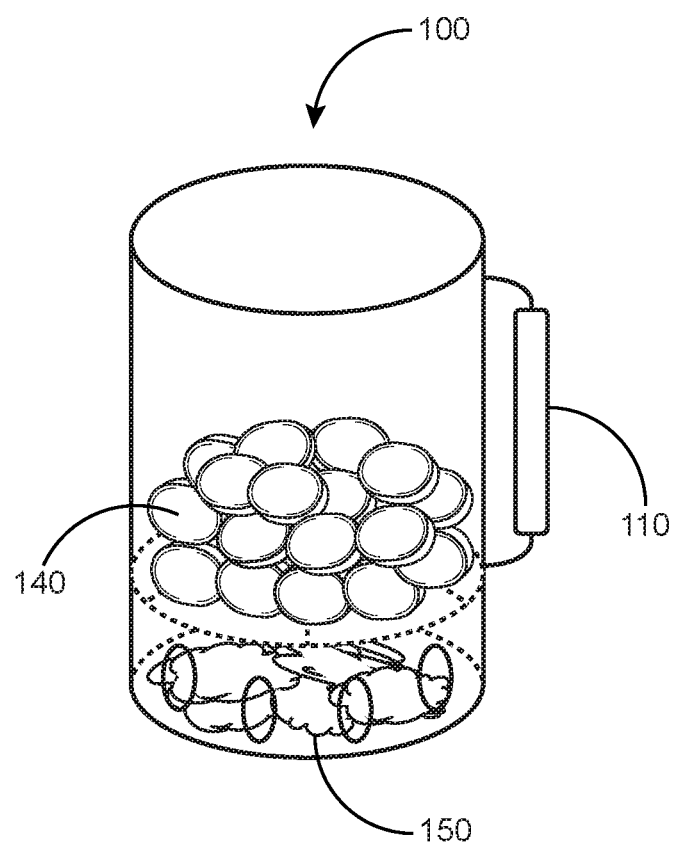
FIG. 2 illustrates a perspective view of the existing type of charcoal starter showing charcoal, used as a fuel source, positioned on a metal support above a flammable material.
Figure 3:
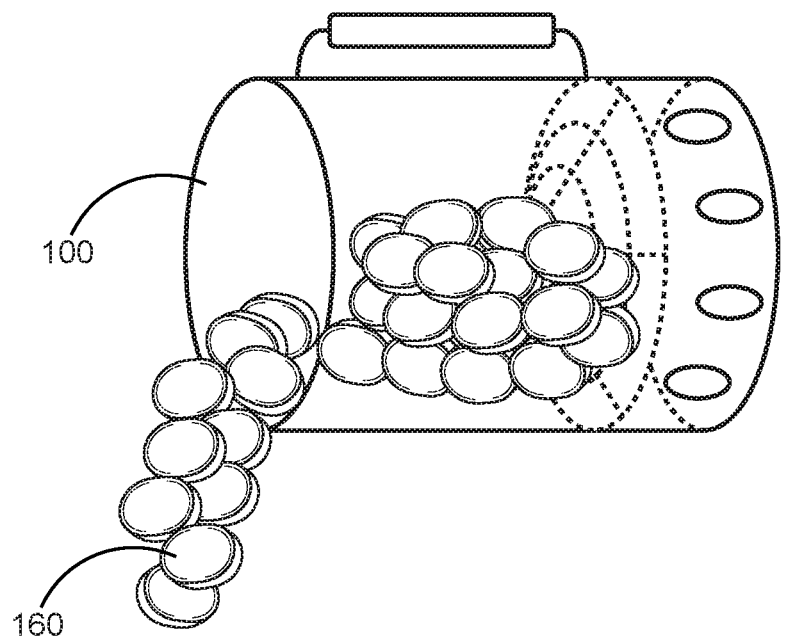
FIG. 3 illustrates a perspective view of the existing type of charcoal starter showing the charcoal being poured out of the charcoal starter.
Figure 4:
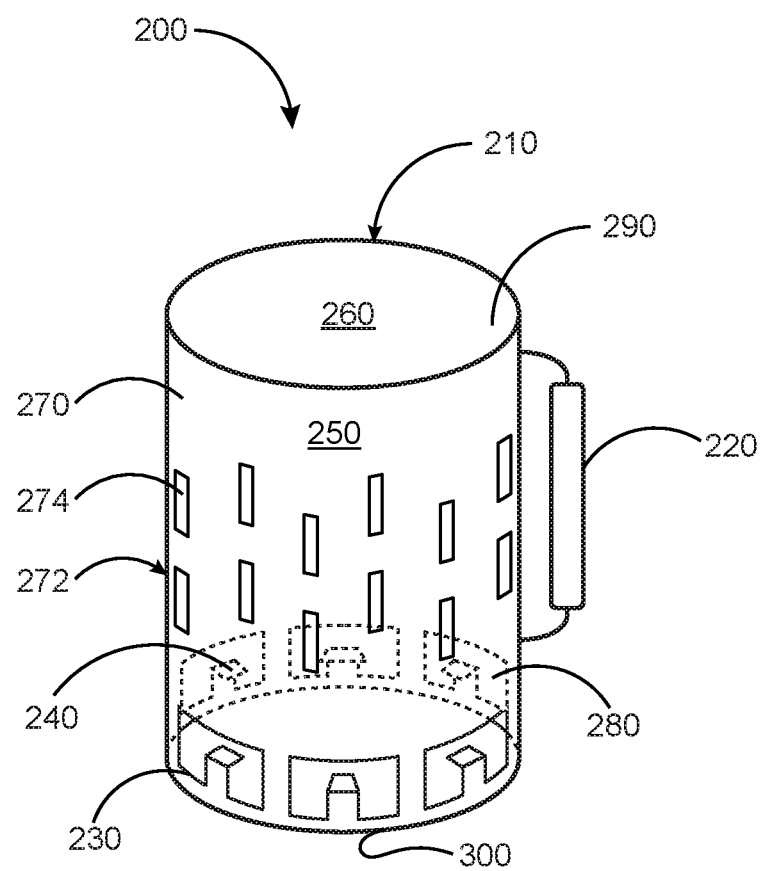
FIG. 4 illustrates a perspective view of a preferred embodiment of a fuel igniting system in accordance with the present invention.
Figure 5:
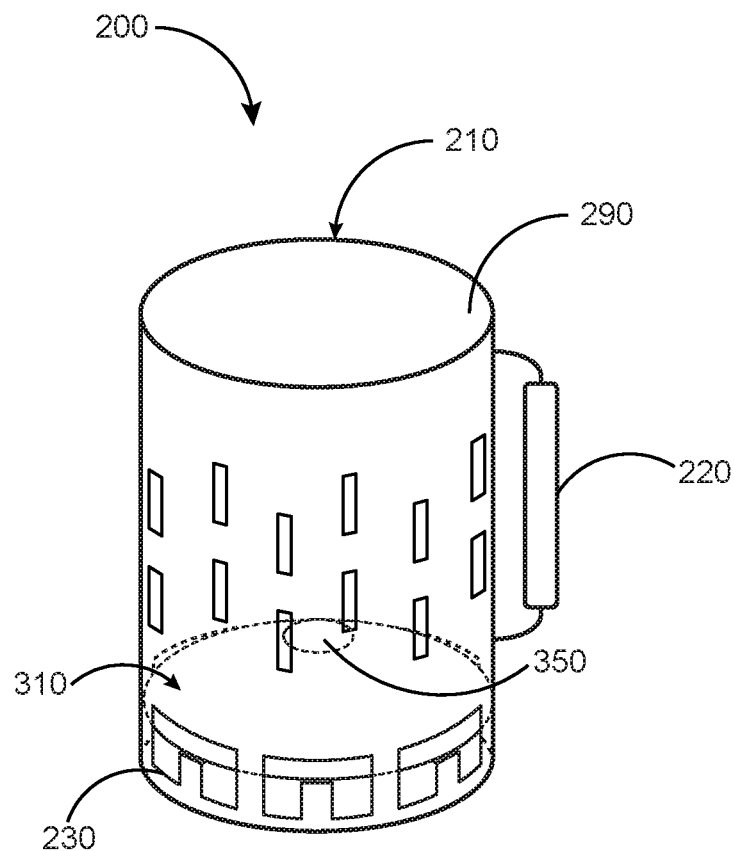
FIG. 5 illustrates a perspective view of a flammable support positioned inside a housing in accordance with the present invention.

Referring now to FIGS. 4-10B of the drawings, a preferred embodiment of a fuel ignition system configured to ignite a fuel source 320 (see FIG. 6) through an ignition process according to the present invention is illustrated in different views and generally designated by the reference numeral 200. Referring to FIGS. 4 and 5, the fuel ignition system 200 comprises a housing 210, a thermally resistant handle 220, and a flammable support 310. The housing 210 includes an outer lateral surface 250, an inner lateral surface 260, a top portion 270, a middle portion 272, a bottom portion 280, a top opening, 290 and a bottom opening 300. The bottom portion 280 includes a plurality of first vent holes, 230 and the middle portion 272 includes a plurality of second vent holes 274. The inner lateral surface 260 includes a plurality of stops 240 associated with the plurality of first vent holes 230 in the bottom portion 280. In the preferred embodiment, the plurality of second vent holes 274 without any stops are arranged in three sets of rows such that each second vent hole 274 in each row overlaps the others by a minimum of ¼ inch. Referring to FIG. 4, each of the plurality of stops 240 is attached to each of the plurality of first vent holes 230 and is projected towards the inner lateral surface 260. In the preferred embodiment, each of the plurality of stops 240 is created during the process of manufacture through the punching process of each of the plurality of first vent holes 230 at the bottom portion 280 of the housing 210. Alternatively, the plurality of stops 240 can be welded to the inner lateral surface 260.

A thermally resistant handle 220 is attached to the outer lateral surface 250. The flammable support 310 and the fuel source 320 (FIGS. 6, 7 and 8) are inserted into the housing 210 through the top opening 290. In the preferred embodiment, the plurality of first vent holes 230 is rectangular shaped and each of the plurality of stops 240 is positioned at a center of each of the plurality of the first vent holes 230.

Figure 6:
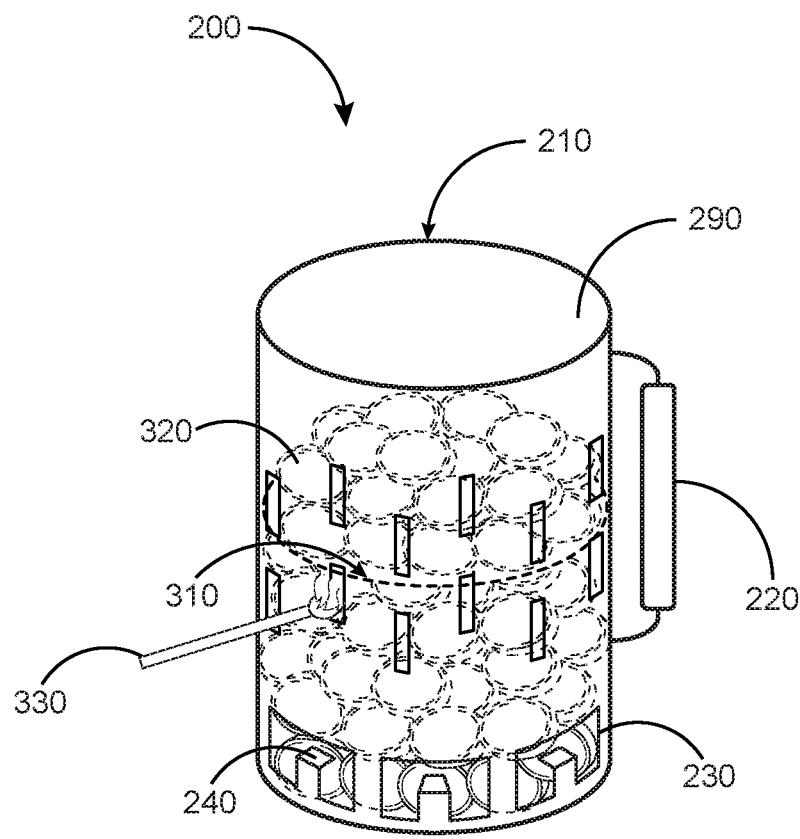
FIG. 6 illustrates a perspective view of the fuel igniting system, showing a fuel source being ignited utilizing an igniting means in accordance with the present invention.
Figure 7:
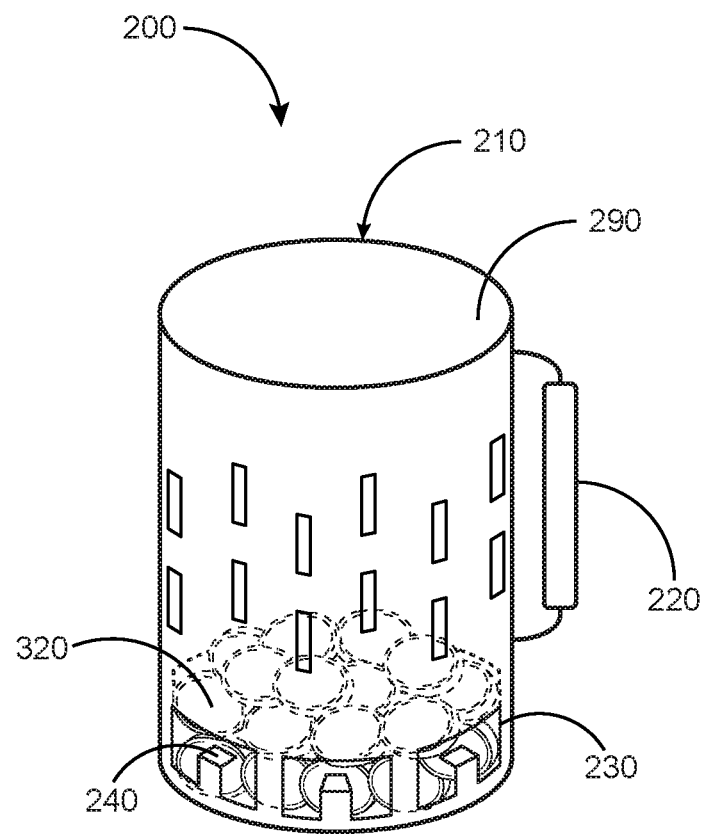
FIG. 7 illustrates a perspective view of the fuel igniting system, showing the ignited fuel source in accordance with the present invention.
Figure 8:
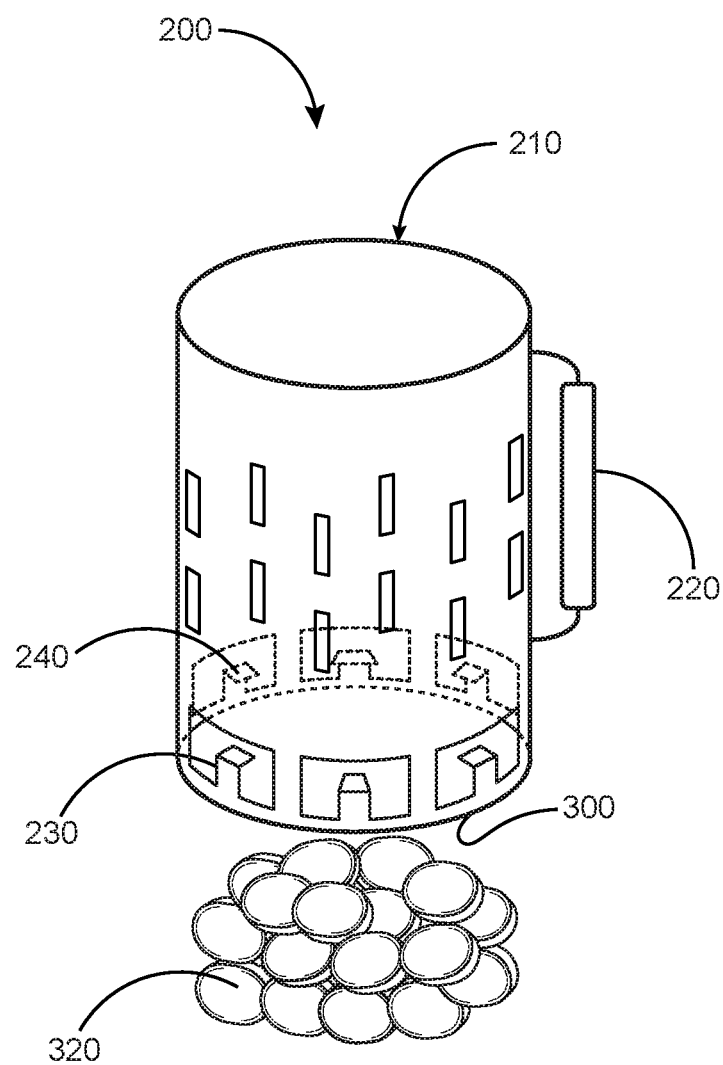
FIG. 8 illustrates a perspective view of the fuel igniting system, showing the ignited fuel source sliding out of the housing and the housing is being lifted away in accordance with the present invention.

In the FIGS. 6-8, the fuel source 320 shown is charcoal. Various types of fuel sources 320 like briquettes, wood chips, and cut wood can also be ignited utilizing the fuel ignition system 200. Referring to FIG. 6, the flammable support 310 is ignited utilizing an igniting means 330 that facilitates a rapid and uniform ignition of the fuel source 320 inside the housing 210. In the preferred embodiment, a lit match is utilized as the igniting means 330. In place of the lit match, a butane torch or any suitable igniting means can also be utilized. The flammable support 310 is thoroughly combusted upon ignition as illustrated in FIG. 7. The ignition of the flammable support 310 creates heat energy inside the housing 210 which is utilized to efficiently ignite the fuel source 320. The ignited fuel source 320 is removed through the bottom opening 300 by lifting the housing 210 in an upward direction via the thermally resistant handle 220 as shown in FIG. 8. The thermally resistant handle 220 allows for safe removing of the hot fuel source 320 from the housing 210.

The plurality of first vent holes 230 provides the adequate air-flow required for the ignition process inside the housing 210. In the preferred embodiment, the flammable support 310 is made from a homogeneous flammable material like wood, charcoal or compressed fiber, which is readily combustible on ignition.

In one configuration of the present invention, the flammable support 310 is made from a non-homogeneous flammable material. Typically, the flammable support 310 is coated with a flammable material that provides rigidity and strength to support the fuel source 320 for easy ignition. In the preferred embodiment, the flammable support 310 is manufactured in conical shaped and includes a top ring hole 350 for adequate air passage in the housing 210.

In use, as shown in FIG. 6, a portion of the fuel source 320 is placed inside the housing 210 high enough to reach at least one row of the second vent holes 274. Thereafter, the flammable support 310 is placed on top of the fuel source inside the housing 210. Next, a remaining portion of the fuel source 320 is placed on top of the flammable support 310 which is then ignited utilizing the igniting means 330 through at least one of the plurality of second vent holes 274. The ignited flammable support 310 in turn ignites the charcoals 320 and gets thoroughly consumed during the ignition process as shown in FIG. 7. In this way, the fuel source 320 is ignited in the top half of the housing 210 while stored additional fuel source below the flammable support 310 is ignited after the fuel source 320 reaches the grill, thus extending the cooking time.

Once the flammable support 310 is ignited and burned away, the hot charcoals 320 may be removed from the housing 210 by simply lifting up the housing 210 via the thermally resistant handle 220 as shown in FIG. 8. With the thoroughly consumed flammable support 210, the hot charcoals 320 fall out the bottom opening 300 of the housing 210 and are left behind in a barbecue unit (not shown) when the user safely lifts the housing 210 away via the thermally resistant handle 220. As the hot charcoals 320 move from the housing 210 to the barbecue unit (not shown), they are contained within the housing walls until the housing 210 is removed, thereby reducing the risk of the user being inured during the hot charcoal 320 transfer process.

In the drawings through FIGS. 4-8, the housing 210 is cylindrical shaped. However, various geometric shapes like square, hexagonal or octagonal also can be implemented.

Figure 9A:
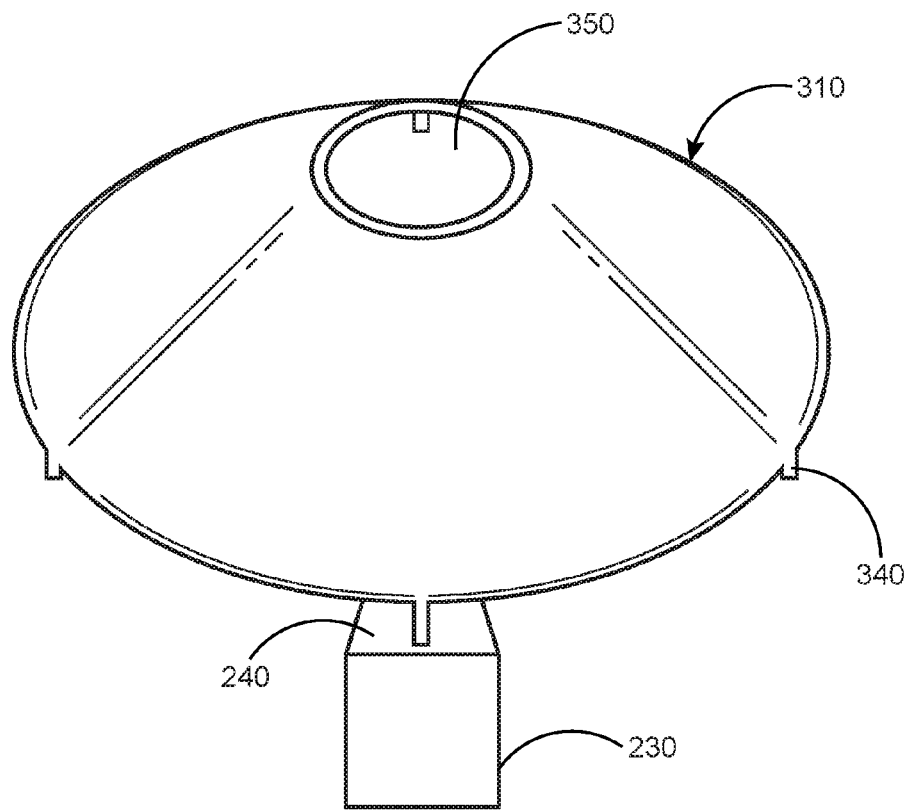
FIG. 9A illustrates a top perspective view of the fuel igniting system, showing at least one of a plurality of protrusions of a flammable support in accordance with the present invention.
Figure 9B:
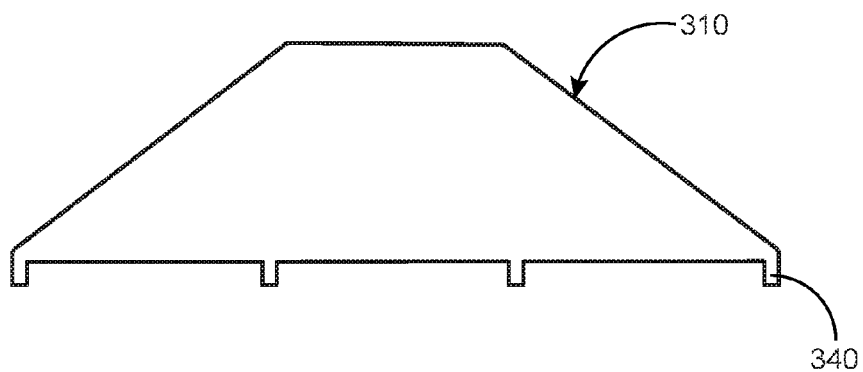
FIG. 9B illustrates a side perspective view of the embodiment shown in FIG. 9A.

In FIGS. 9A and 9B, top and side perspective views of the fuel igniting system are illustrated. At least one of a plurality of protrusions 340 of a flammable support is positioned between at least one of the plurality of stops 240 of the first vent hole 230.

Figure 10A:
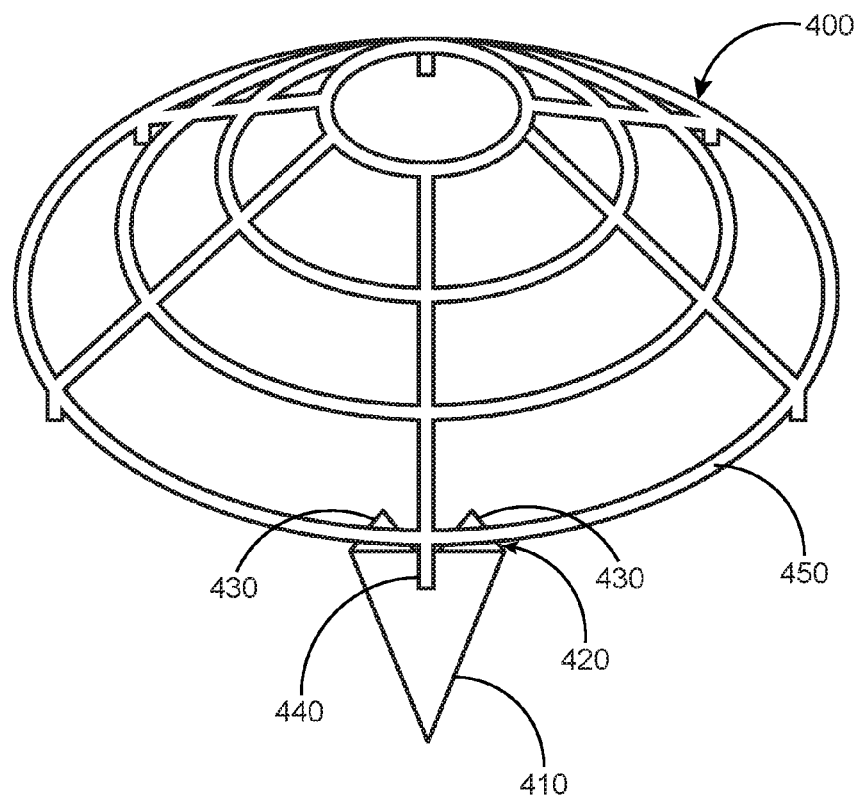
FIG. 10A illustrates a top perspective view of another embodiment of the fuel igniting system, showing at least one of a plurality of protrusions of a flammable support positioned between two tabs of a vent in accordance with the present invention.
Figure 10B:
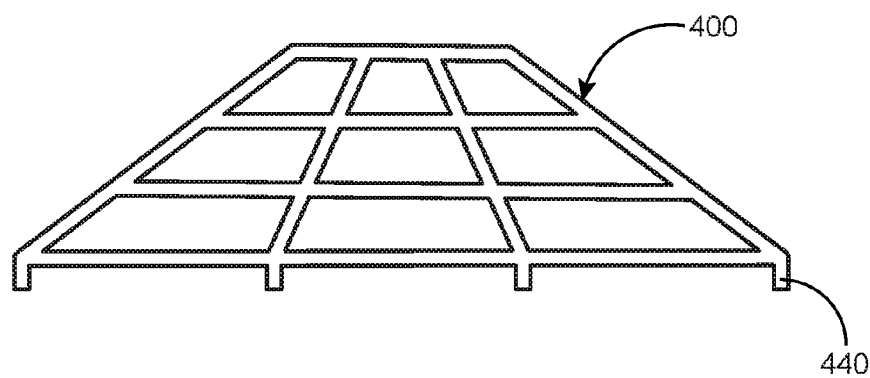
FIG. 10B illustrates a side perspective view of the embodiment shown in FIG. 10A.

FIGS. 10A and 10B show another configuration of the present invention. In this alternate configuration, the flammable support 400, the plurality of first vent holes, 410 and the plurality of stops 420 have different designs from those illustrated through FIGS. 4-9B. Here, each of the plurality of stops 420 splits into two smaller tabs 430. Preferably, the flammable support 400 includes a plurality of protrusions 440. The splitting of the plurality of stops 420 into tabs 430 allows each protrusion 440 of the flammable support 400 to be firmly positioned between the tabs 430. Each protrusion 440 serves as a wick for the ignition of the flammable support 400 and is accessed through the plurality of first vent holes 410. The flammable support 400 includes a plurality of rings 450 designed to securely hold the fuel source 320 thereon.

Figure 11A:
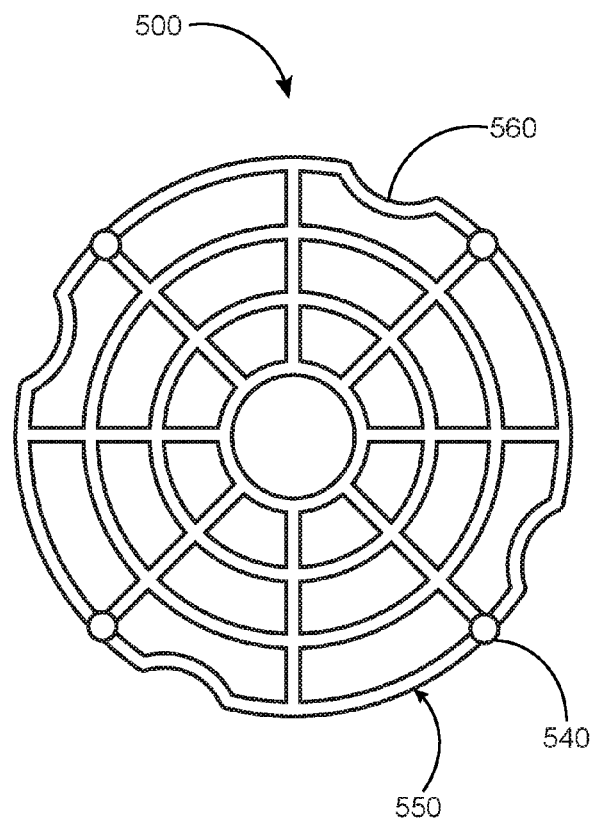
FIG. 11A illustrates a perspective view of yet another embodiment of the present invention, showing a plurality of indents at a bottom ring of a flammable support in accordance with the present invention.
Figure 11B:
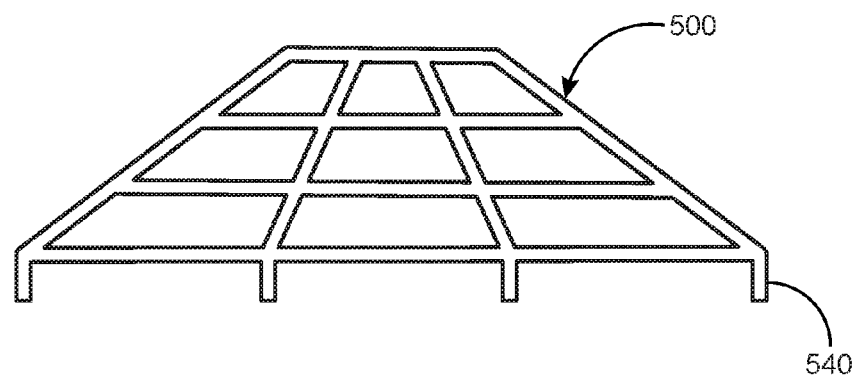
FIG. 11B illustrates a side perspective view of the embodiment shown in FIG. 11A.

FIGS. 11A and 11B illustrate yet another configuration of a flammable support 500 having a plurality of indents 560 at a bottom ring 550 thereof. The plurality of indents 560 allows the protrusion 540 to pass by the bottom ring 550 thereby enabling the placement of several flammable supports 500 one above the other during packaging. In this configuration, the flammable support 500 can be placed on top of one another by rotating 1/16 of a turn counter clockwise.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

I claim:

1. A method for igniting a fuel source utilizing a fuel ignition system, the method comprising the steps of:
   a. providing a housing having an outer lateral surface, an inner lateral surface, a top opening and a bottom opening, and a plurality of vent holes and a plurality of stops on a bottom portion of the housing;
   c. positioning a flammable support over the plurality of stops through the top opening of the housing;
   d. adding the fuel source, wherein the fuel source is positioned above and below the flammable support;
   e. igniting the flammable support utilizing an igniting means;
   f. facilitating a rapid and uniform ignition of the fuel source utilizing the heat generated during the ignition of the flammable support inside the housing; and
   g. wherein the flammable support is the only flammable component of the system.

2. The method of claim 1 wherein the fuel igniting system further comprises a thermally resistant handle.

3. The method of claim 2 further comprising removing the fuel source through the bottom opening of the housing by lifting the housing in an upward direction utilizing the thermally resistant handle.

4. The method of claim 1 wherein the flammable support is formed from a homogeneous flammable material.

5. The method of claim 1 wherein the flammable support is formed from a non-homogeneous flammable material.

6. The method of claim 1 wherein the plurality of vent holes provides sufficient air flow required for the ignition process inside the housing.

7. The method of claim 1 wherein the fuel source is selected from the group consisting of charcoal, briquettes, wood chips, and cut wood.

8. The method of claim 1 wherein each of the plurality of stops projects towards the inner lateral surface of the housing.

9. The method of claim 1 further comprising securely holding the fuel source via a plurality of rings on the flammable support.

10. A method for igniting a fuel source utilizing a fuel ignition system, the method comprising the steps of:
    a. providing a housing having an outer lateral surface, an inner lateral surface, a top portion, a bottom portion, a top opening and a bottom opening, a plurality of vent holes positioned at the bottom portion, and a plurality of stops positioned at the inner lateral surface, and wherein a thermally resistant handle is attached to the outer lateral surface;
    b. positioning a flammable support over the plurality of stops, wherein the flammable support is the only flammable component of the fuel ignition system;
    c. placing a fuel source against the flammable support, wherein the fuel source is positioned above and below the flammable support;
    d. igniting the flammable support;
    e. creating from the igniting step a heat energy sufficient to ignite the fuel source but not any other housing component.

11. The method of claim 10 wherein each of the plurality of stops is attached to each of the plurality of vent holes.

12. The method of claim 11 wherein each of the plurality of stops projects towards the inner lateral surface.

13. The method of claim 11 wherein the plurality of vent holes provides sufficient air flow required for the ignition process inside the housing.

14. The method of 10 further comprising placing the flammable support in position through the top opening of the housing.

15. The method of 10 wherein the flammable support is formed of a readily combustible material.

16. The method of claim 10 wherein the fuel source is selected from the group consisting of charcoal, briquettes, wood chips, cut wood, and combinations thereof.

17. The fuel ignition system of claim 10 wherein the flammable support and the fuel source are inserted into the housing through the top opening.

18. The method of claim 10 further comprising securely holding the fuel source via a plurality of rings on the flammable support.

19. The fuel ignition system of claim 10 further comprising lifting the housing in an upward direction so the ignited fuel source is removed through the bottom opening.

20. The method of claim 10 wherein the flammable support is formed from a homogeneous flammable material.

21. The method of claim 10 wherein the flammable support is formed from a non-homogeneous flammable material.

* * * * *